Figure 1:
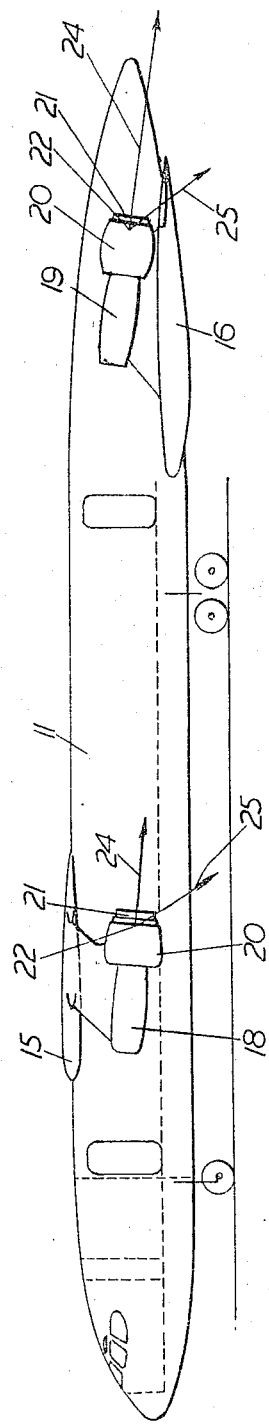

Dec. 6, 1966   L. J. HALL   3,289,975
AIRCRAFT

Filed Sept. 21, 1964   4 Sheets-Sheet 1

Inventor
Leslie James Hall
By Dowell & Dowell
Attorneys

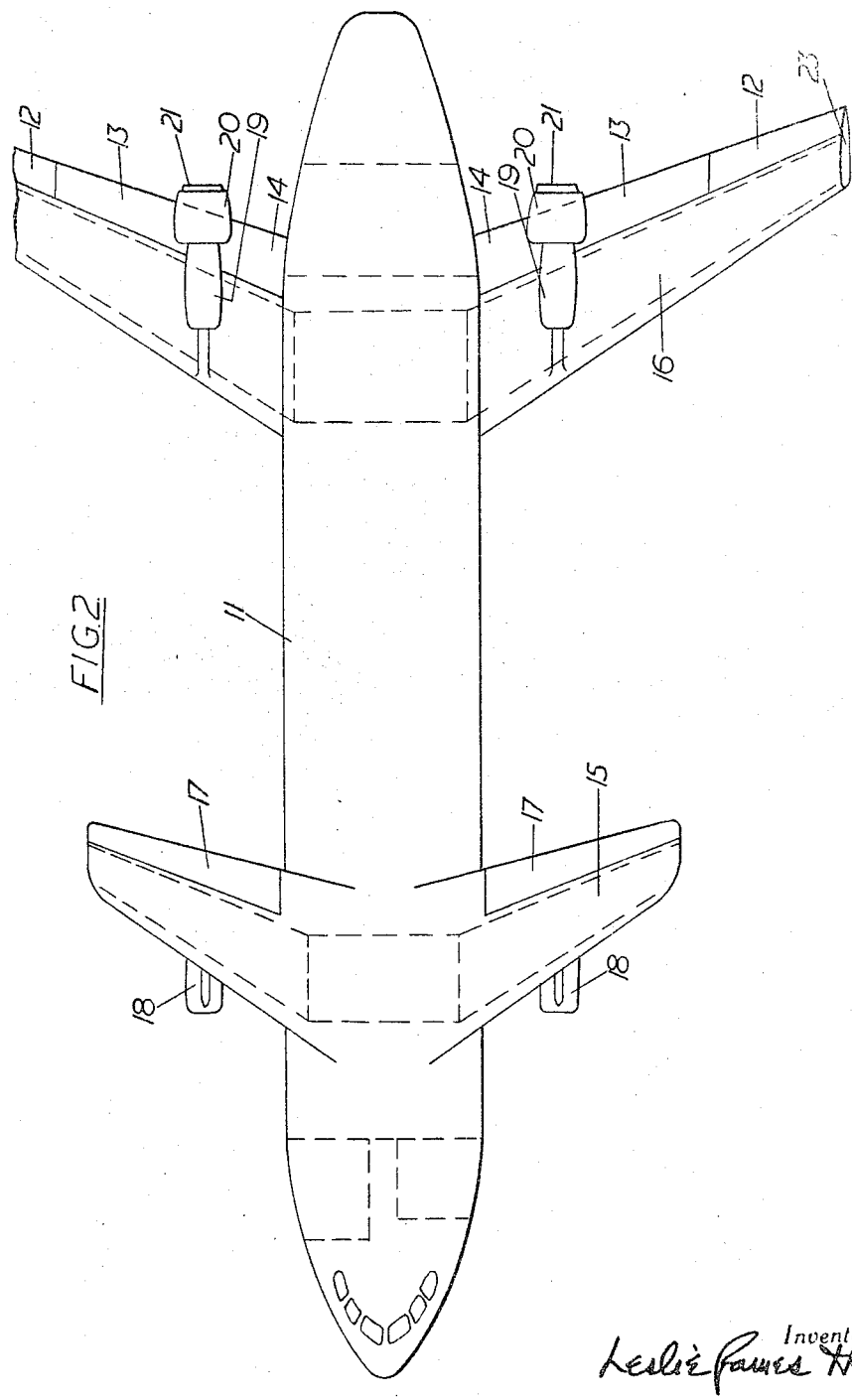

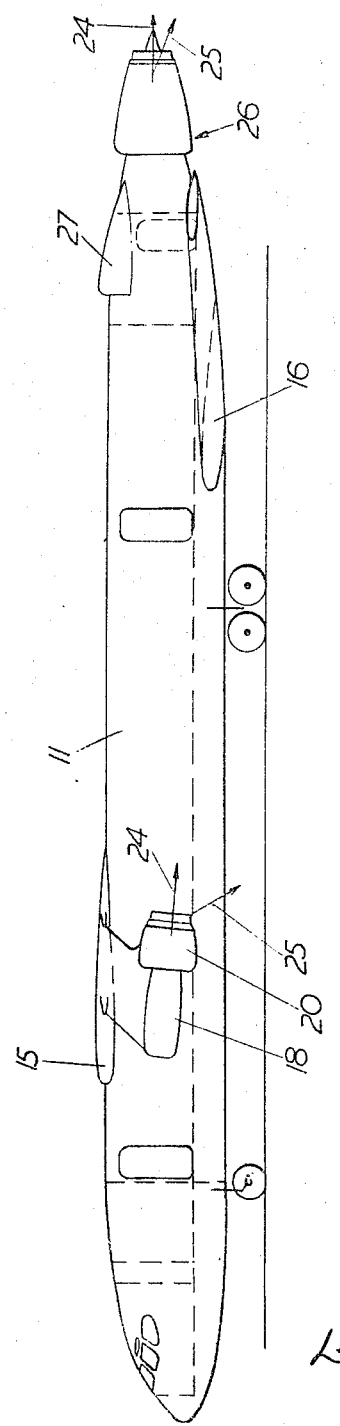

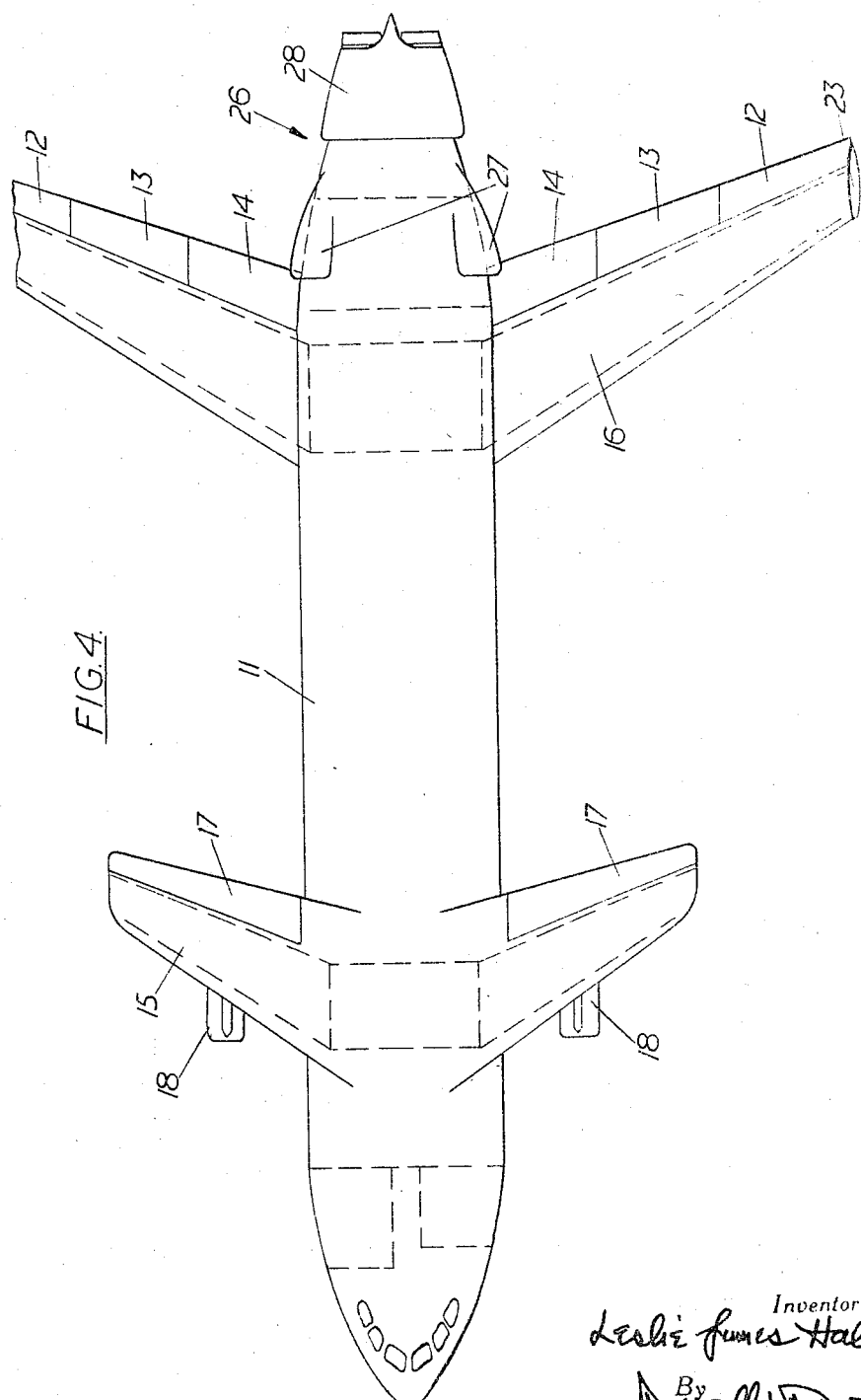

United States Patent Office 3,289,975
Patented Dec. 6, 1966

3,289,975
AIRCRAFT
Leslie James Hall, Hatfield, England, assignor to Hawker Siddeley Aviation Limited, London, England, a British company
Filed Sept. 21, 1964, Ser. No. 397,712
Claims priority, application Great Britain, Sept. 23, 1963, 37,347/63
8 Claims. (Cl. 244—12)

This invention relates to aircraft.

A primary factor in the design of an aircraft for civil purposes and especially one that is to operate regular passenger services, is operating economy. In considering the operating cost of an aircraft it is necessary to take into account both the day-to-day running costs and also the first or capital cost. It is an object of this invention to provide an aircraft of considerably lower operating cost than present conventional aircraft and in which the saving is achieved without special requirements of the aircraft in regard to the airfields from which it operates.

According to the present invention, there is contemplated an aircraft having tandem wings, with a total wing area chosen at substantially the minimum area necessary to fulfill the aircraft lift requirement during normal cruising flight, the additional lift needed for low speed flight being obtained by downward deflection of the efflux of jet propulsion engines constituting the aircraft power plant.

The lower operating costs are achieved by the fact that the aircraft utilises lift obtainable from thrust deflection during the take-off and landing stages, not in order to shorten the take-off or landing run, but so as to make it possible to provide less wing area, simplify high lift devices, and employ a tandem wing, the theoretical advantages of which have hitherto not been fully realizable owing to penalties incurred due to requirements of trim and control.

By choosing a wing arrangement of minimum area, and avoiding complicated, heavy and expensive high-lift devices, a substantial saving in wing weight and cost is obtained as compared with a conventional aircraft layout. Also some shortening of the fuselage results from this type of layout which again represents a weight saving. It is to be understood that a tandem wing arrangement does not imply that the foreplane and the main or afterplane are necessarily of equal area. A range of foreplane areas, relative to the main plane, is invisaged from about half the main plane area up to equality of area but the area ratio is not a limitation of this invention as fore and main planes can be selected to operate at different lift coefficients.

According to a further feature of the invention, the aircraft engines are grouped forward and aft, the forward engines being associated with the foreplane, and the aft engines being mounted on the afterplane, and/or in the fuselage tail.

In the absence of deflected thrust a tandem aircraft might be expected to suffer from the known disadvantages of a canard aircraft or foreplane layout. These are in connection with the large trim and control forces and the foreplane downwash acting on the main plane all of which factors have made it impossible to realize the full lift potential. However, the above defined engine layout substantially relieves this difficulty such that the potential advantages of a canard can be realised. These are that all aerodynamic surfaces provide positive lift contrary to a conventional aircraft where control and trim forces usually contribute a down load. In the low speed phase the angle of attack and the coefficient of lift are modest and thus foreplane downwash is minimised.

Both trim and control forces can be obtained by a suitable combination of aerodynamic devices and differential engine thrust and deflection, or by using any one of these devices.

Two aircraft design layouts embodying the invention will now be described by way of example, reference being had to the accompanying diagrammatic drawings in which:

FIGURES 1 and 2 are respectively a side elevation and plan of the first embodiment, and FIGURES 3 and 4 are a side elevation and plan of the second embodiment.

Referring firstly to FIGURES 1 and 2, the aircraft shown has a comparatively wide fuselage 11 and wings consisting of a foreplane 15 and a main plane 16 in tandem, the foreplane 15 being placed high on the fuselage while the main plane 16 is at a low level. The foreplane 15 has an area equal to about 75% of the area of the main plane 16; it will be noted that the wings are comparatively small, the total wing area being selected substantially at the size needed for high speed cruising flight which permits choice of the optimum coefficient of lift. At lower flight speeds additional lift is obtained by downward deflection of the engine jet effluxes as will be described. Aerodynamic control surfaces are provided on the wings in the form of flaps 12, 13, 14, 17; these may be required for little more than trimming if, as is possible, actual maneuvering of the aircraft is achieved by jet deflection. Alternatively, it may be preferable to use the control surfaces for maneuvering and to utilize jet deflection for trim purposes, or to combine the two possibilities.

The power plant of the aircraft comprises four jet propulsion engines, two engines 18 being carried in pods under the foreplane 15 while the other two engines 19 are mounted in pods on top of the main plane 16. Each engine is a high bypass ratio engine employing a ducted fan 14 at its aft end. That is to say in addition to the hot gas efflux issuing from the combustion chamber and turbine of the engine, the engine drives a fan 20 disposed in a duct of greater diameter than the forward portion of the engine pod and which draws in air direct from the atmosphere which is mixed with the engine efflux.

Provision is made for deflection of the jet effluxes of all four engines. Each of the ducted fans 20 has an outlet nozzle 21 that is capable of swivelling in the vertical plane about a horizontal axis 22, thereby to change the direction of the jet efflux from almost wholly rearward, as indicated by the arrows 24, to downward and rearward, as indicated by the arrows 25. Thus, some portion of the jet effluxes of all four engines 18, 19 can be directed downwardly to give additional lift at take-off and during low speed flight. And by appropriate differential adjustment of the nozzles the attitude of the aircraft can be controlled, although aerodynamic assistance may be required to control the attitude in roll. Other forms of jet deflection are possible and may be necessary in some cases.

It is to be noted that, whereas in various prior aircraft downward deflection of jet effluxes has been employed to give additional lift for the purpsose of enabling the aircraft to become airborne in a very short distance, the downward jet deflection in the present case is not particularly intended to give the aircraft a short take-off capability but is for the purpose of making up the additional lift that is not furnished by the wings under conditions of low speed flight, i.e. during take-off or landing at conventional speeds. Although as described the wing area is sufficient to give the full lift needed for normal cruise, it may be beneficial to maintain a small degree of downward jet deflection under cruise conditions, as indicated by the arrows 24.

Conventional fins 23 are provided at the wing tips of the main plane 16, these being omitted from FIGURE 1 for the sake of clarity.

In FIGURES 3 and 4 the aircraft layout is modified in that the two rear engines are mounted side-by-side in the tail 26 of the fuselage. These engines receive their air through a pair of intakes 27 at or near the top of the fuselage just forward of the engine position, the intakes may be arranged for boundary layer ingestion, if desired. As before, each engine has a ducted fan at its aft end these fans being housed in a duct 28 large enough to extend out beyond the periphery of the portion of the fuselage tail in which the engines are mounted so as to draw in air from around the fuselage. Boundary layer ingestion may take place here also. The fan effluxes can be directed mostly rearwardly (arrow 24) or downwardly and rearwardly (arrow 25) as in the first embodiment.

Among modifications that are possible without departing from the scope of the invention is further re-arrangement of the propulsion plant. Thus, while engines with aft fans are shown, front fan engines can also be used. And although the rear engines are shown as independent units each with its own bypass fan, several engines, for example gas generators, can be associated with a single fan. Or the forward or rear engines, or both, can be arranged to give a jet flap effect.

Whereas in the two embodiments illustrated wing tip fins are employed, directional control in yaw may, if desired, be obtained by lateral vectoring of the jet effluxes of the rear engines without the need for a fin or rudder. Directional stability of the aircraft can then be maintained by differential throttling and/or thrust vectoring of the engines on the opposite sides of the aircraft under the control of an automatic pilot. Similarly, with the use of deflected thrust under fully automatic control natural stability in pitch can be dispensed with resulting in yet further weight saving.

I claim:

1. An aircraft with conventional take off and landing capability, comprising, in combination: a fuselage, a main plane mounted aft on said fuselage, a fore plane mounted forward on said fuselage having an area in the range of about 0.5 to 1.0 of the area of said main plane, the total wing area of said main plane and fore plane together being equal to substantially the minimum area necessary to fulfill the aircraft lift requirement during normal cruising flight but insufficient for take-off and landing, a first group of jet propulsion engines mounted forward, a second group of jet propulsion engines mounted aft, and thrust-deflecting means on engines of at least one of said groups selectively operable to deflect the engine effluxes downwardly, the additional lift needed for flight at speeds below cruising speed being obtained by operation of said thrust deflecting means.

2. An aircraft according to claim 1, whereing the fore plane is set high on the fuselage and the main plane is low.

3. An aircraft according to claim 1, wherein the forward engines are carried in pods under the fore plane.

4. An aircraft according to claim 1, wherein the aft engines mounted on top of the main plane.

5. An aircraft according to claim 1, wherein there are two engines side by side in the fuselage tail.

6. An aircraft according to claim 1, wherein at least some of the engines are high bypass ratio engines each having a ducted fan and means for controlling the direction of emission of the efflux in the vertical plane.

7. An aircraft according to claim 1, wherein at least the aft engines are arranged for boundary layer ingestion.

8. An aircraft according to claim 1, wherein control is obtained by means of vectoring of the jet effluxes rather than by the movement of aerodynamic surfaces.

References Cited by the Examiner

UNITED STATES PATENTS

| | | | |
|---|---|---|---|
| 3,026,065 | 3/1962 | Holland | 244—12 |
| 3,051,413 | 8/1962 | Pouit | 244—12 |
| 3,126,170 | 3/1964 | Dornier | 244—12 |
| 3,165,280 | 1/1965 | Shao-Tang Lee | 244—56 |

FERGUS S. MIDDLETON, *Primary Examiner.*

MILTON BUCHLER, *Examiner.*

L. C. HALL, A. E. CORRIGAN, *Assistant Examiners.*